(12) United States Patent
Mitchell

(10) Patent No.: US 10,480,667 B2
(45) Date of Patent: Nov. 19, 2019

(54) STORAGE TANK VALVE

(71) Applicant: Lafayette Mitchell, Lafayette, LA (US)

(72) Inventor: Lafayette Mitchell, Lafayette, LA (US)

(73) Assignee: Ron J. Gaubert, Lafayette, LA (US)

(*) Notice: Subject to any disclaimer, the term of this patent is extended or adjusted under 35 U.S.C. 154(b) by 207 days.

(21) Appl. No.: 15/158,334

(22) Filed: May 18, 2016

(65) Prior Publication Data
US 2017/0335986 A1    Nov. 23, 2017

(51) Int. Cl.
| | |
|---|---|
| *F16K 24/00* | (2006.01) |
| *F16K 24/04* | (2006.01) |
| *F16K 1/12* | (2006.01) |
| *F16K 31/46* | (2006.01) |
| *F16K 31/06* | (2006.01) |
| *F16K 31/524* | (2006.01) |
| *F16K 31/60* | (2006.01) |
| *F16K 1/20* | (2006.01) |
| *F16K 5/04* | (2006.01) |
| *F17C 1/12* | (2006.01) |
| *F17C 13/04* | (2006.01) |
| *F16K 3/08* | (2006.01) |

(52) U.S. Cl.
CPC ............... *F16K 24/04* (2013.01); *F16K 1/12* (2013.01); *F16K 1/2007* (2013.01); *F16K 3/085* (2013.01); *F16K 5/0442* (2013.01); *F16K 31/06* (2013.01); *F16K 31/46* (2013.01); *F16K 31/465* (2013.01); *F16K 31/52408* (2013.01); *F16K 31/52441* (2013.01); *F16K 31/602* (2013.01); *F17C 1/12* (2013.01); *F17C 13/04* (2013.01); *F17C 2205/0332* (2013.01); *F17C 2205/0341* (2013.01); *F17C 2270/0102* (2013.01); *F17C 2270/0165* (2013.01)

(58) Field of Classification Search
CPC .......... F16K 1/12; F16K 24/04; F16K 31/465; F16K 31/52441; F17C 13/04; F17C 2205/0332
See application file for complete search history.

(56) References Cited

U.S. PATENT DOCUMENTS

| | | | | |
|---|---|---|---|---|
| 3,289,686 A | * | 12/1966 | Tyer, Jr. | ............... F16K 17/003 137/529 |
| 3,631,893 A | * | 1/1972 | Seaman | ............... F16K 17/168 137/517 |
| 3,771,566 A | * | 11/1973 | McMath | ............... F16K 11/02 137/625.49 |

(Continued)

*Primary Examiner* — Reinaldo Sanchez-Medina

(57) ABSTRACT

A valve for use in a tank vessel that includes a valve housing configured to fit into a threaded vent opening of the tank vessel and a sleeve weldment coupled to the valve housing. The sleeve weldment includes a first end configured to protrude into an interior volume of the tank vessel, and the first end is thermally balanced with the interior volume of the tank vessel. The valve also includes a valve plunger configured to be installed within the sleeve weldment. The valve plunger includes a valve bottom configured to seal an opening between the valve bottom and an interior opening of the sleeve weldment. The valve also may include a cam configured to force the valve plunger into the interior of the tank vessel to break the seal between the valve bottom and the interior opening of the sleeve weldment.

9 Claims, 10 Drawing Sheets

(56) References Cited

U.S. PATENT DOCUMENTS

| | | | | |
|---|---|---|---|---|
| 3,844,312 | A | * | 10/1974 | Sumner .................. F16K 17/30 137/460 |
| 3,974,850 | A | * | 8/1976 | Pierson .................. F16K 17/19 137/493.9 |
| 4,036,255 | A | * | 7/1977 | Wilson ................... F16K 11/02 137/202 |
| 6,142,167 | A | * | 11/2000 | Pettesch ................. F16K 17/36 137/39 |
| 8,353,310 | B2 | * | 1/2013 | Lin ........................ F16K 1/126 137/221 |
| 2010/0084029 | A1 | * | 4/2010 | Lin .......................... F16K 1/12 137/553 |

\* cited by examiner

STORAGE TANK VALVE

FIELD OF THE INVENTION

The present invention relates, generally, to the field of valves for use in insulated tank vessels that transport and store liquid material.

BACKGROUND

Tank vessels are designed to carry liquefied loads or gases on roads, seas, oceans, and rails. Many variants exist due to the wide variety of liquids and gases that can be transported. The tank vessels, for many long-distance transportation uses, tend to be large and may be insulated, pressurized, and designed for single or multiple loads (often by means of internal divisions in their tank). A tank vessel may have several openings and valves to monitor, protect against, and release pressure buildup within the tank vessel. A tank vessel may be loaded through a manway on a top part of the tank vessel, and unloaded through an opening in the bottom of the tank vessel. In some instances, the tank vessel may be loaded with a liquid material (e.g., paraffin, rosins, resins, etc.) that solidifies at typical atmospheric ambient temperatures. In these instances, the tank vessel may be insulated to maintain the higher temperature of the material and thus enable faster unloading without extra time spent melting the liquid material.

During transportation of the material from within the tank vessel, the pressure within the tank vessel may increase. To protect against this potential pressure buildup, precautionary measures may include opening a relief valve at the top of the tank vessel to allow gas (e.g., air) to exit the tank vessel to maintain the pressure. These relief valves are often in thermal contact with the exterior of the tank vessel and, thus, generally have a temperature that is the atmospheric ambient temperature. For materials that are solid at atmospheric ambient temperature, the relief valves may be plugged as the liquid material is agitated during transport. The transported material washes over the relief valve, which repeatedly applies a thin layer to the interior of the relief valve. That is, as the tank vessel shifts during transport, the material may slosh over the relief valve, leaving a small amount of the material. After many hundreds of applications of the material, a significant plug may develop.

The plugs that develop within the tank vessel may also be detrimental during evacuation of the material. In many instances, the material exits the tank vessel through an opening in the bottom, taking advantage of the pull due to gravity. To allow the material to better flow out, a manway or other opening may be opened in the top of the tank vessel, enabling pressure to equalize from the top while material exits the bottom. The plugs may block this pressure equalization, slowing the material, or causing damage to the tank vessel.

Removing such plugs may be a difficult and/or time consuming project for an operator. The operator may climb up a ladder to the top of the tank vessel and open the valve by twisting nuts or bolts, which in many cases can be pressurized due to the plugs on the relief valves. Indeed, due to the plugs developed on the valves, the operator may be unaware of the dangerous condition since any reading of the internal pressure of the tank vessel may be unreliable. A pressurized tank vessel may result, in some instances, in an operator being injured by the valve itself, or by sudden shifting of the valve causing the operator to fall from the tank vessel.

A need exists for a release valve that reliably remains free from plugs caused by solidifying material on an interior surface of the release valve. The embodiments described below address this need.

A need exists for a release valve that may be opened from a ground surface near a tank vessel without requiring an operator to climb to the top of the tank vessel. The embodiments described below address this need.

SUMMARY

A valve for use in a tank vessel that includes a valve housing configured to fit into a threaded vent opening of the tank vessel and a sleeve weldment coupled to the valve housing. The sleeve weldment includes a first end configured to protrude into an interior volume of the tank vessel, and the first end is thermally balanced with the interior volume of the tank vessel. The valve also includes a valve plunger configured to be installed within the sleeve weldment. The valve plunger includes a valve bottom configured to seal an opening between the valve bottom and an interior opening of the sleeve weldment. The valve also may include a cam configured to force the valve plunger into the interior of the tank vessel to break the seal between the valve bottom and the interior opening of the sleeve weldment.

In certain embodiments, the valve may include a spring configured to bias the valve plunger away from the interior of the tank vessel to maintain the seal. The sleeve weldment may also include a top valve guide and a bottom valve guide configured to centralize the valve plunger within the sleeve weldment.

In certain embodiments, the valve may include a hose attachment coupled to the cam housing. The hose attachment may be configured to connect to a pressurizing hose, a venting hose, or combinations thereof. The pressurizing hose may also be configured to pressurize a cavity within the cam housing to a valve pressure that is greater than a tank pressure within the interior volume of the tank vessel.

In certain embodiments, the valve may include a handle coupled to an exterior of the valve housing and configured to rotate the cam in response to a force from an operator. In certain embodiments, the valve may include a cable connected to the handle and a remote trigger. The operator may manipulate the remote trigger to pull the cable and rotate the handle on the valve housing while standing on a ground location near the tank vessel. The vent opening may be a 3.75 inch (8.89 cm) portal fitted with national pipe thread (NPT).

The disclosed embodiments may also include a tank vessel for storing and transporting liquid material. The tank vessel may include an exterior surface, an interior surface, and insulation positioned between the exterior surface and the interior surface configured to thermally insulate the liquid material within an interior volume of the tank vessel at a temperature that is higher than an atmospheric ambient temperature, and a release valve configured to selectively enable gases to flow between the interior volume and an external hose. The release valve may include a distal end configured to protrude into and to be thermally balanced with the interior volume of the tank vessel. The tank vessel may also include a remote trigger coupled to the exterior surface and configured to trigger the release valve while an operator is standing on a ground location near the tank vessel.

In certain embodiments, the liquid material that tank vessel is configured to transport may solidify at atmospheric ambient temperatures. The external hose of the tank vessel may also include a filtering system configured to filter the pressurized gases flowing from the interior volume on the tank vessel. The external hose may also be connected to a connection hub at a rear of the tank vessel.

In certain embodiments, the release valve may be located one-third a distance from a front of the tank vessel, or one-third a distance from a rear of the tank vessel. In certain embodiments, the tank vessel may include a relief valve configured to vent pressure buildup within the interior volume of the tank vessel. The tank vessel may also include an additional release valve configured to open when triggered by the remote trigger.

The disclosed embodiments also include a release valve for venting gases in a tank vessel. The release valve may include an upper valve housing configured to fit to an exterior surface of the tank vessel. The valve housing may allow gases to pass through when the release valve is open, and seal gases from passing through when the release valve is closed. The release valve may also include a lower valve housing coupled at a first end to the upper valve housing. The lower valve housing may include a second end configured to protrude through an insulation layer of the tank vessel and at least partially into an interior volume of the tank vessel, the second end is thermally balanced with the interior volume of the tank vessel. The release valve may also include a remote trigger configured to be controlled by an operator while the operator is located at a ground location.

In certain embodiments, the release valve may include a cable between the remote trigger and the upper valve housing. The cable is configured to open the release valve when the remote trigger is controlled by the operator. In certain embodiments, the release valve may include an electronic connection between the remote trigger and the upper valve housing. The release valve is configured to open in response to an electric signal.

In certain embodiments, the release valve may include a hose connection configured to connect the upper valve housing to a hose. The hose is configured to vent the gases from an interior volume of the tank vessel to a venting location. The remote trigger may be configured to be controlled without using tools.

DESCRIPTION

Before describing selected embodiments of the present disclosure in detail, it is to be understood that the present invention is not limited to the particular embodiments described herein. The disclosure and description herein is illustrative and explanatory of one or more presently embodiments and variations thereof, and it will be appreciated by those skilled in the art that various changes in the design, organization, means of operation, structures and location, methodology, and use of mechanical equivalents may be made without departing from the spirit of the invention.

As well, it should be understood that the drawings are intended to illustrate and plainly disclose embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

Moreover, it will be understood that various directions such as "upper", "lower", "bottom", "top", "left", "right", and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

Figure 1:
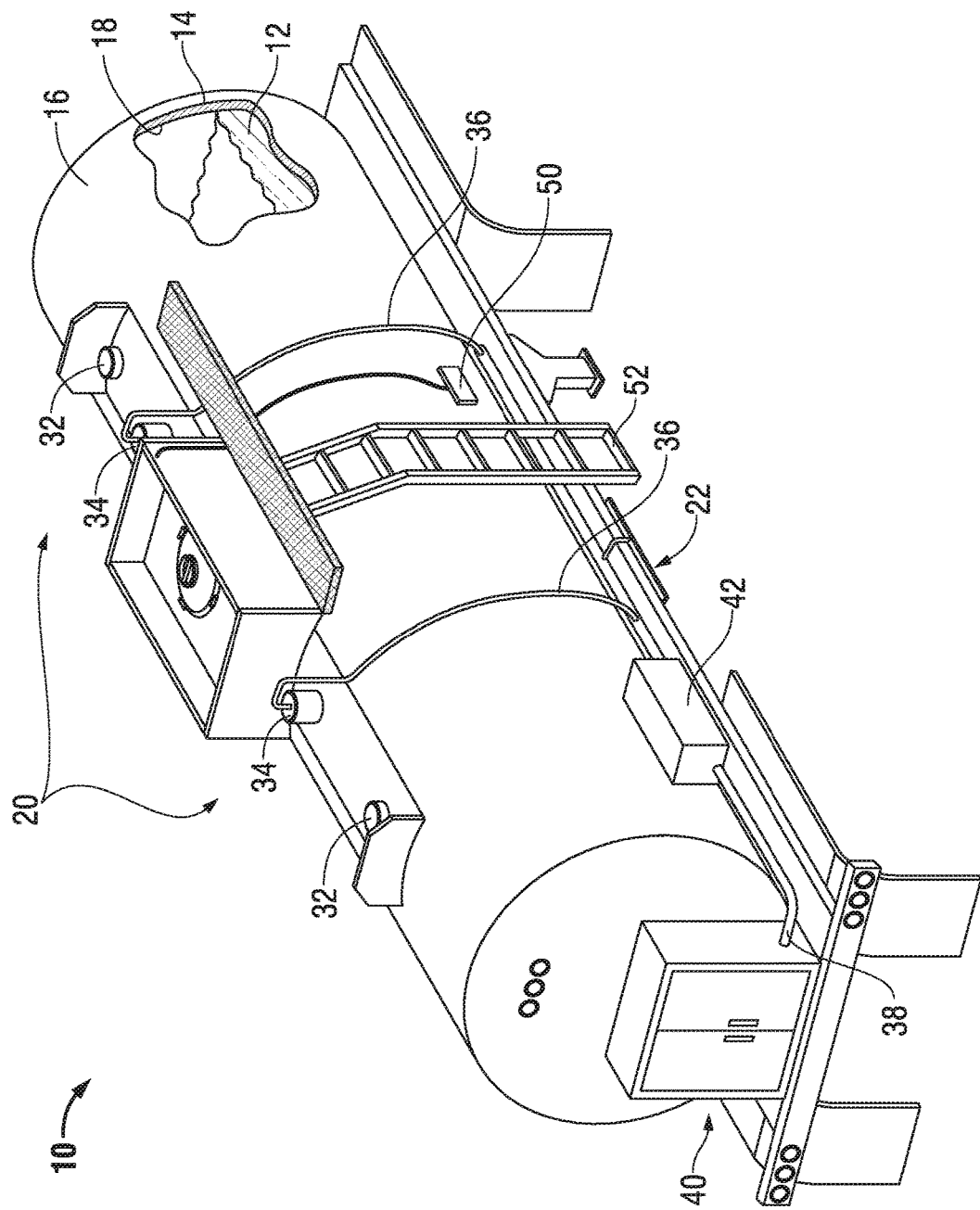
FIG. 1 illustrates an embodiment of a tank vessel with a plug-free release valve.

FIG. 1 illustrates a tank vessel 10 that may be used to transport and store a liquid material 12. The liquid material 12 may be paraffin, rosin, resin, wax, petroleum jelly, or other material that solidifies at atmospheric ambient temperature. The tank vessel may include insulation 14 that is located between an external surface 16 and an interior surface 18 of the tank vessel 10. The tank vessel 10, as illustrated, may include embodiments intended to be transported by road. In certain embodiments, the tank vessel 10 may also include vessels that may be transported by rail, or by ship. The insulation 14 of the tank vessel 10 may ensure that the interior temperature of the liquid material 12 does not drop to the atmospheric ambient temperature for up to several days. The tank vessel may also include heaters and/or steam tubes to increase the temperature of the liquid material 12 before the liquid material 12 is unloaded.

For loading and unloading of the tank vessel 10, the tank vessel 10 may include several top openings 20 and bottom openings 22. The top openings 20 may include a manway 30, which may be used to load the liquid material 12 and may also be used by an operator to enter the tank vessel 10 for cleaning. Additionally, the tank vessel 10 may include relief valves 32 and release valves 34. In certain embodiments of the tank vessel 10, the top openings 20 include 4 or 5 vent openings that have a 3.75 inch (8.89 cm) portal fitted with national pipe thread (NPT). The vent openings and matched valves (e.g., relief valves 32 and release valve 34) are specifically made to connect and seal in these openings.

The relief valves 32 work to alleviate an increase in pressure by opening at a specific pressure to allow gases to escape when the pressure inside the tank vessel 10 is too high. The relief pressure may be gauged according to regulations for transporting liquid material. Relief valves 32 can be important to prevent over-pressurizing that may result in accidental rupture of the tank or one of the valves. The relief valves 32 respond mostly without an operator's manipulation to provide relief from high pressure within the tank vessel 10. Release valves 34, on the other hand, are used manually to pressurize or depressurize the tank vessel 10 during loading or unloading of the liquid material 12. As explained below, the release valves 34 extend through the insulation 14 into the interior of the tank vessel 10 to prevent buildup of the liquid material 12 onto the release valve 34.

The release valve 34 may be connected to a hose 36 to vent gases from within the tank vessel 10. The gases may, in certain embodiments, be governed by regulations that prevent release into the atmosphere. The hose 36 may be installed so as to provide a permanent connection between the release valve 34 and a connection hub 38 at a rear portion 40 of the tank vessel 10. The connection hub 38 may connect to a venting system at the destination plant or location. The hose 36 may also include a filtering system 42 permanently installed on the tank vessel 10. The filtering system 42 may provide the gas and/or liquid treatment mechanisms to allow safe venting at the final destination for the tank vessel 10. For example, the filtering system 42 may slow down the flow of gases exiting the tank vessel 10 to protect the additional hose connected to the connection hub 38.

In certain embodiments, the hose 36 may be used to pressurize the interior of the tank vessel 10. For example, the connection hub 38 may be connected to a nitrogen source that pressurizes the hose 36. Once the release valve 34 is opened, the pressurized nitrogen ensures that there is a positive movement of the liquid material 12 through the opening 22 in the bottom of the tank vessel 10.

The release valve 34 may be opened remotely from the release valve 34 by using a remote trigger 50. The remote trigger 50 may be a switch connected by a cable attached to a handle on the release valve 34. In certain embodiments, the remote trigger 50 may include an electronic trigger that initiates a solenoid to open the release valve 34. The remote trigger 50 increases safety for an operator by enabling them to operate the release valve 34 from a ground location, rather than climbing up a ladder 52 to manually open the release valve 34. The ground location may be located near the ladder 52, or may be located at other locations near the tank vessel 10. For example, the remote trigger 50 may be located near the connection hub 38 so that an operator may quickly connect an additional venting hose to the connection hub 38 and then open the release valve 34. Furthermore, opening the release valve 34 from the ground saves additional time due to the operator not having to climb onto the tank vessel 10, put on safety harnessing equipment, or use any tools to open the release valve 34.

Figure 2:
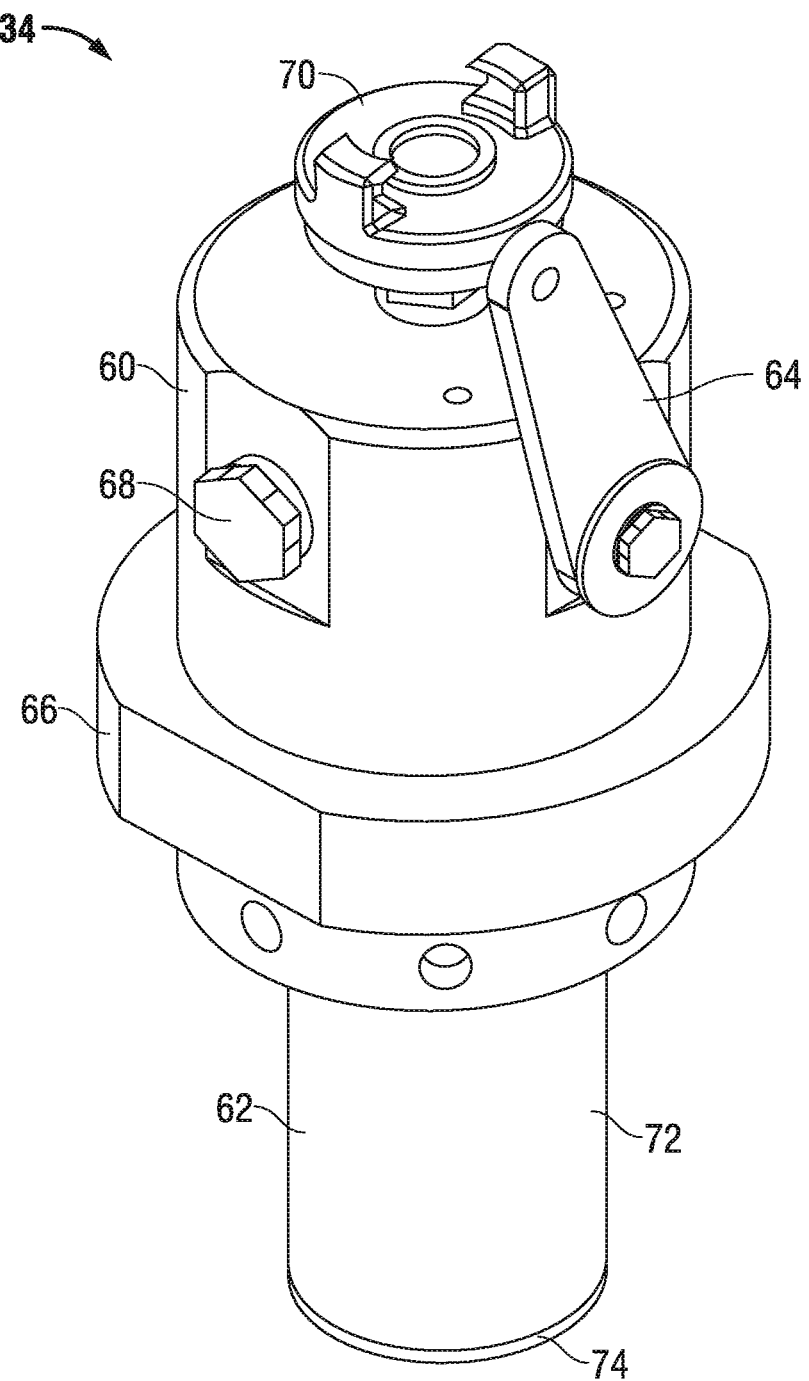
FIG. 2 illustrates a perspective view of an embodiment of a plug-free release valve.

FIG. 2 illustrates an embodiment of the release valve 34 that may be used on the tank vessel 10 of FIG. 1. The release valve 34 includes an upper housing 60 and a lower housing 62. The upper housing 60 is installed on the exterior of the tank vessel 10 and in certain embodiments houses the cam, as explained below. The upper housing 60 also includes the release valve handle 64 that is used to open the valve 34. The release valve handle 64, for example, rotates or turns to release, force, turn, push, or pull a valve within the lower housing 62 of the release valve 34. Between the upper housing 60 and the lower housing 62, the release valve 34 includes a coupling nut 66 that secures the release valve 34 to the tank vessel 10. As mentioned above, the coupling nut 66 may fit within a 3.75 inch (8.89 cm) NPT opening. The upper housing 60 may also include an external pipe plug 68. Connected to the upper housing 60 is a hose connector 70 that couples to the hose 36 in order to vent or pressurize the tank vessel 10. The illustrated hose connector 70 shows a crowfoot connection that is coupled to the hose 36 through a twisting motion. Other embodiments may include additional or alternative hose connections such as screwing, snapping, clamping, compression fitting, or others.

The lower housing 62 of the release valve 34 includes a sleeve weldment 72 that houses the valve mechanisms that are opened by the release valve handle 64. The sleeve weldment 72 is long enough to protrude through the insulation 14 of the tank vessel 10 so that a distal end 74 of the sleeve weldment 72 is thermally balanced with the interior of the tank vessel 10. Thermally balancing the distal end 74 with the interior prevents the liquid material 12 from solidifying onto the valve 34. Since the lower housing 62 will not layer solidified liquid material 12, the release valve 34 as a whole will not develop a plug. To further prevent formation of a plug, the lower housing 62 may include valve components (examples shown in FIGS. below) that extend from the sleeve weldment 72 into the interior of the tank vessel 10. In certain embodiments, the lower housing 62 may include components that retreat from the distal end 74 of the lower housing 62. In alternative or additional embodiments, the components may twist, shift, or collapse to open the distal end 74 of the lower housing 62.

Figure 3:
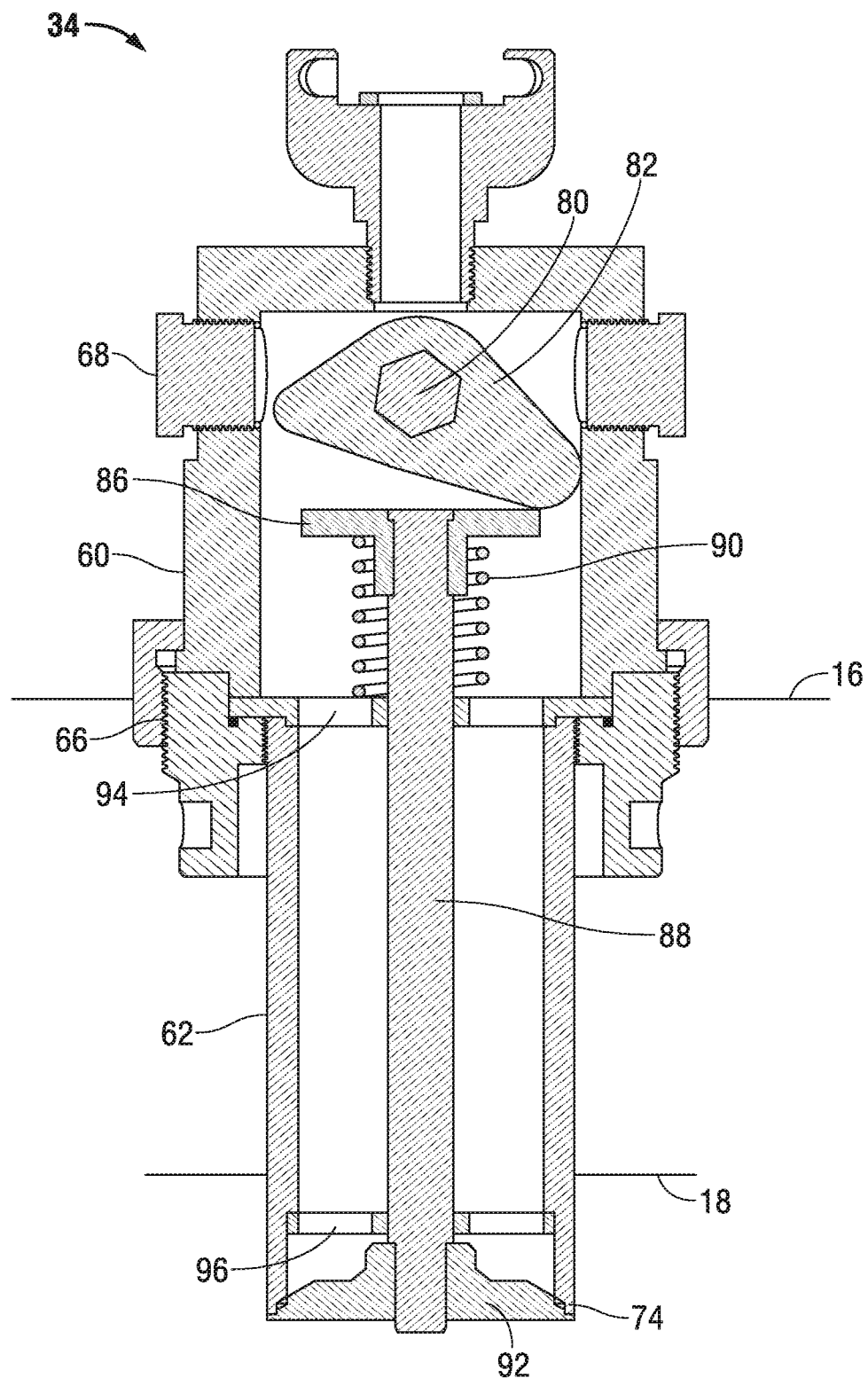
FIG. 3 illustrates a cross-sectional view of an embodiment of a plug-free release valve in a closed position.

FIG. 3 illustrates an embodiment of the release valve 34 in a closed position. As stated above, the distal end 74 of the release valve 34 protrudes from the interior surface 18 into an interior volume 78 of the tank vessel 10. The liquid material 12 may contact the distal end 74 during transport (e.g., agitation of the tank vessel 10 causes sloshing of the liquid material 12), but the distal end 74 is warm enough (e.g., thermally balanced to the interior volume 78 of the tank vessel 10) so that the liquid material 12 does not solidify onto the release valve 34. The liquid material 12 simply drips or runs off the release valve 34, leaving a free pathway for gases to pass through the release valve 34.

To open the release valve 34, the upper housing 60 includes a cam shaft 80 connected to the handle 64 of the release valve 34. The cam shaft 80 connects to a cam 82 that moves a valve plunger assembly 84. In the illustrated embodiment, the valve plunger assembly 84 includes a valve top 86 configured to receive the force from the cam 82, a valve stem 88, a spring 90, and a valve bottom 92. The valve stem 88 connects the valve top 86 to the valve bottom 92 and keeps the valve plunger assembly 84 aligned within the sleeve weldment 72. The sleeve weldment 72 may include upper guides 94 and lower guides 96 to secure the valve plunger assembly 84 and prevent vibration, leakage, or wear during transport. The spring 90 may also secure the valve plunger assembly 84 within the sleeve weldment 72. Other securing components may also be used in the release valve 34.

Figure 4:
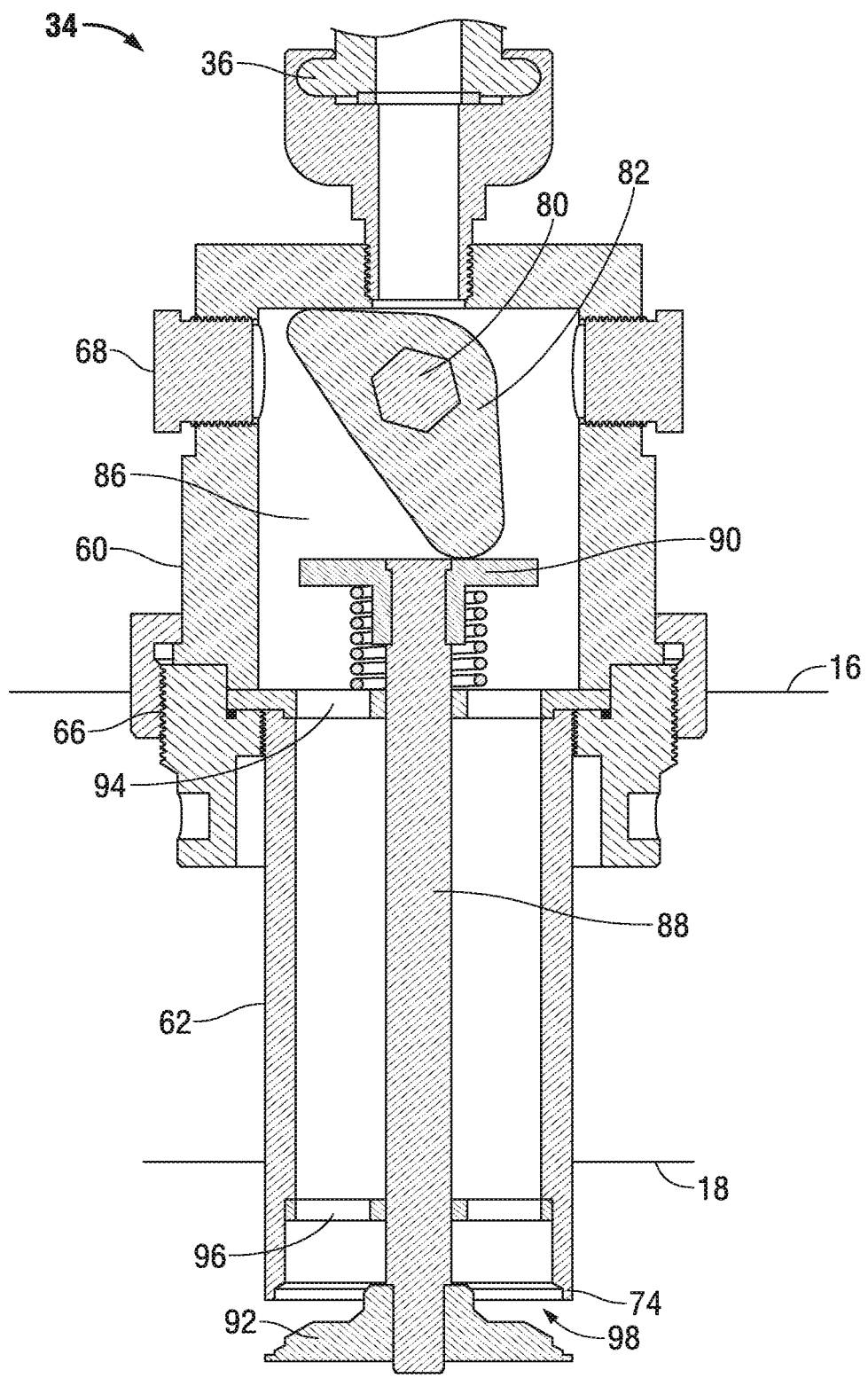
FIG. 4 illustrates a cross-sectional view of an embodiment of the plug-free release valve of FIG. 2, in an opened position.

FIG. 4 illustrates the embodiment of the release valve 34 shown in FIG. 3 in an opened position. The cam 82 has been rotated (e.g., by rotating the handle 64) to push down on the valve top 86 which has shifted the valve plunger assembly 84 down 100. The valve bottom 92 no longer blocks the distal end 74 of the release valve 34 and an opening 98 now enables gases to pass through the release valve 34. The opening 98 enables gases to pass in either direction through the release valve 34. For example, if the pressure in the interior volume 78 is higher than an external pressure, gases from the interior volume 78 will flow through the release valve 34 and into the hose 36. Conversely, if the hose 36 is pressurized, gases will flow into the interior volume 78 through the release valve 34.

Figure 5:
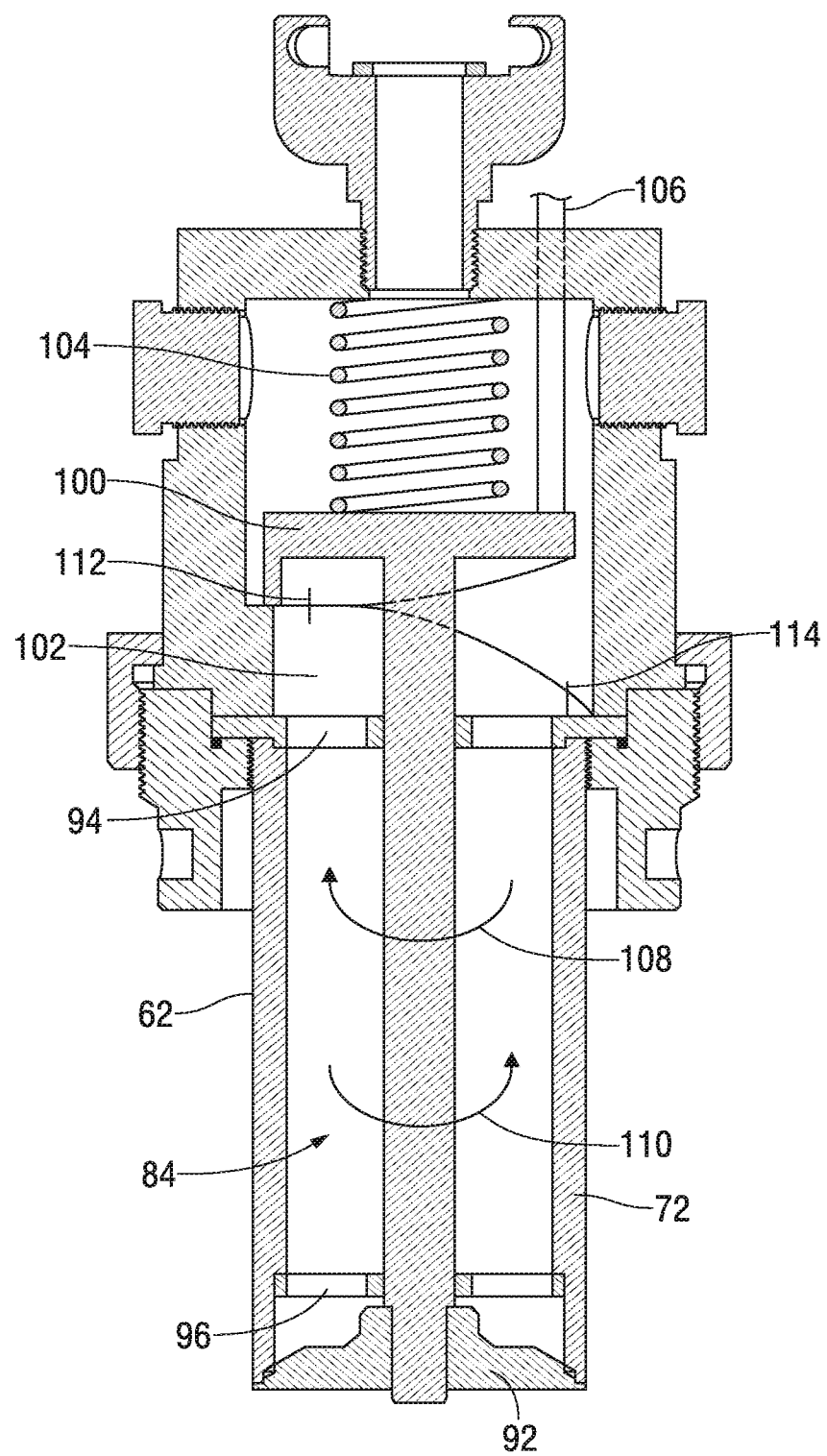
FIG. 5 illustrates a cross-sectional view of an embodiment of the plug-free release valve of FIG. 2.

FIG. 5 illustrates a cross-sectional view of an embodiment of the plug-free release valve of FIG. 2. The illustrated embodiment includes a sleeve weldment 72 that protrudes into the interior volume 78 of the tank vessel 10, and is thermally balanced with the interior volume 78. The embodiment shows a twisting plunger assembly 100 that slides along a descending track 102 to open opening 102 in a similar manner to the embodiment shown in FIG. 4. A spring 104 maintains a force toward the bottom of the release valve 34 to keep the twisting plunger assembly 100 from shifting during transport. The twisting plunger assembly 100, the descending track 102, or combinations thereof may have features that further assist in maintaining a position of the twisting plunger assembly 100. For example, the descending track 102 may have teeth that match to complementary teeth on the twisting plunger assembly 100. To twist the twisting plunger assembly 100, the release valve 34 may include a twisting rod 106 that enables an operator to control the relationship between the twisting plunger assembly 100 and the descending track 102.

An operator may adjust the twisting rod 106 to twist the twisting plunger assembly 100 in a clockwise direction 108 or a counter-clockwise direction 110. In the illustrated embodiment, the valve bottom 92 is closed because a tab 112 of the twisting plunger assembly 100 is located at a high part of the descending track 102. If an operator adjusts the twisting rod 106 to rotate the tab 112 clockwise 108 to a trough 114 of the descending track 102, then the valve bottom 92 drops and opens the opening 98 in the sleeve weldment 72. Conversely, if the operator adjusts the twisting rod 106 to rotate the tab 112 back counter-clockwise 110, the valve bottom 92 will move up and close the opening 98.

Figure 6:
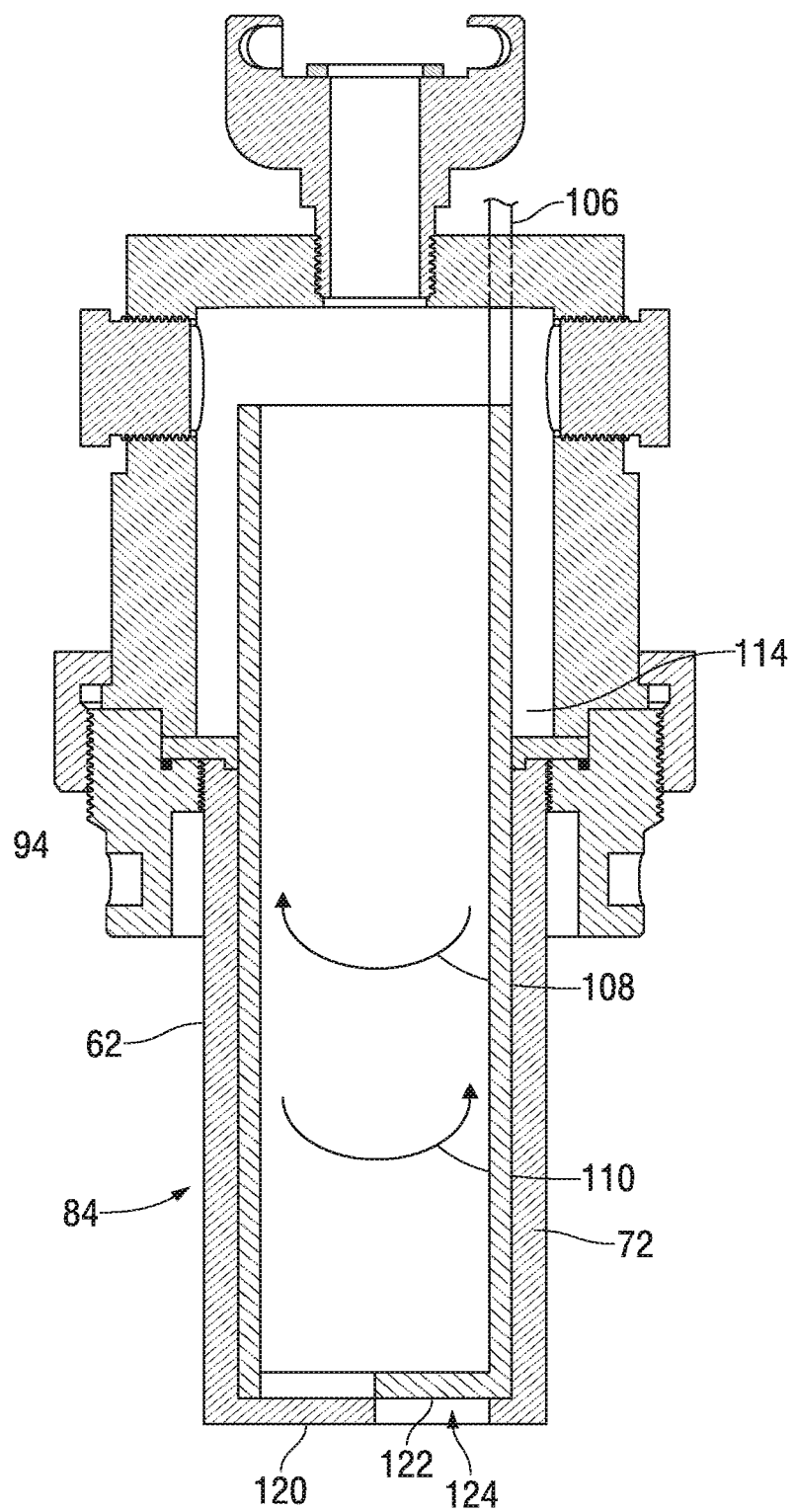
FIG. 6 illustrates a cross-sectional view of an embodiment of the plug-free release valve of FIG. 2.

FIG. 6 illustrates a cross-sectional view of an embodiment of the plug-free release valve 34 of FIG. 2. The release valve 34 includes a hole cover 120 at the distal end 74 of the sleeve weldment 72. The hole cover 120 covers a portion of the opening 98 while a sleeve insert 122 may cover the remaining portion. For example, the hole cover 120 may cover half of the opening 98 in the sleeve weldment 72 while the sleeve insert 122 covers that remaining half. In other embodiments, the hole cover 120 may cover two-thirds or three-quarters of the opening 98 while the insert 122 covers the remaining one-third or one-quarter. To open the release valve 34, the operator adjusts the twisting rod 106 to rotate the insert 122 either clockwise 108 or counter-clockwise 110 until the covered portion of the insert 122 lines up with the hole cover 120, leaving an opening 124 through the sleeve weldment 72 and the insert 122. The opening 124 is large enough for pressure to release but since the opening 124 is thermally balanced with the interior volume 78 of the tank vessel 10, the opening 124 does not develop a plug when the liquid material splashes onto the hole cover 120 or the insert 122.

Figure 7:
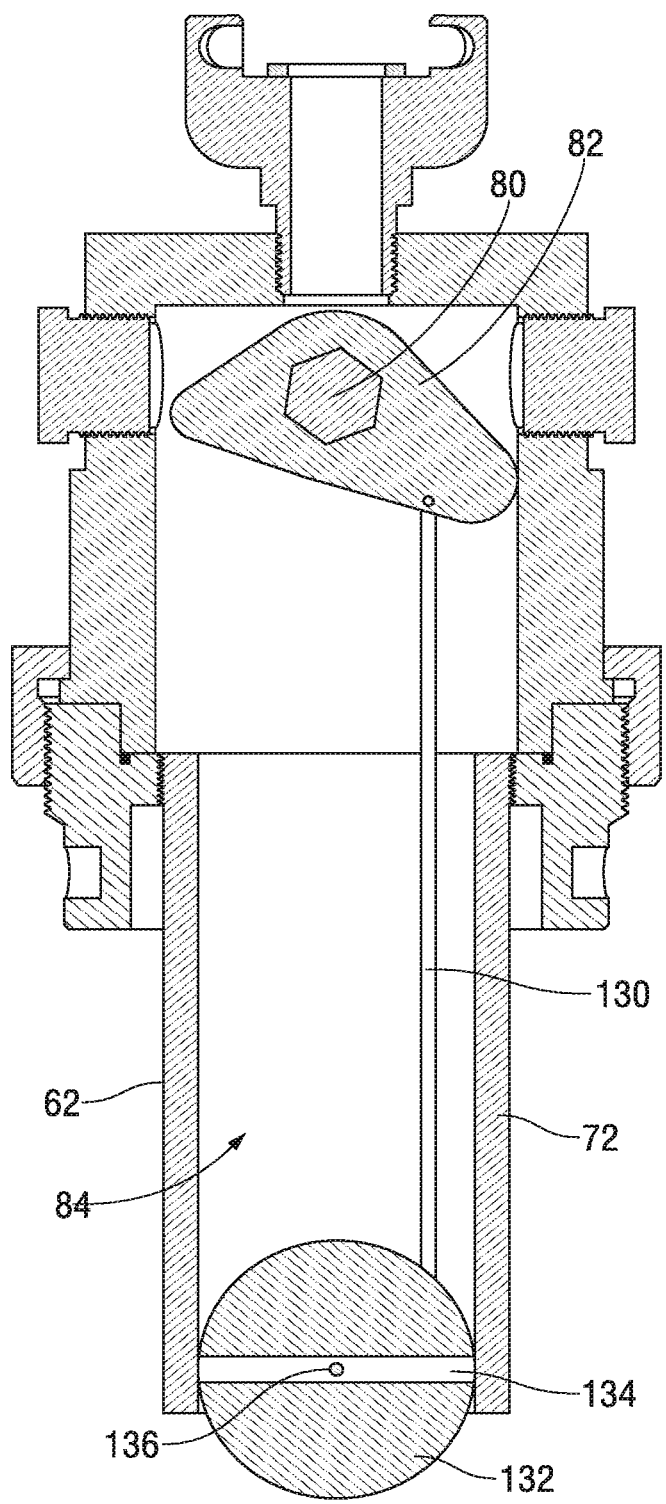
FIG. 7 illustrates a cross-sectional view of an embodiment of the plug-free release valve of FIG. 2.
Figure 8:
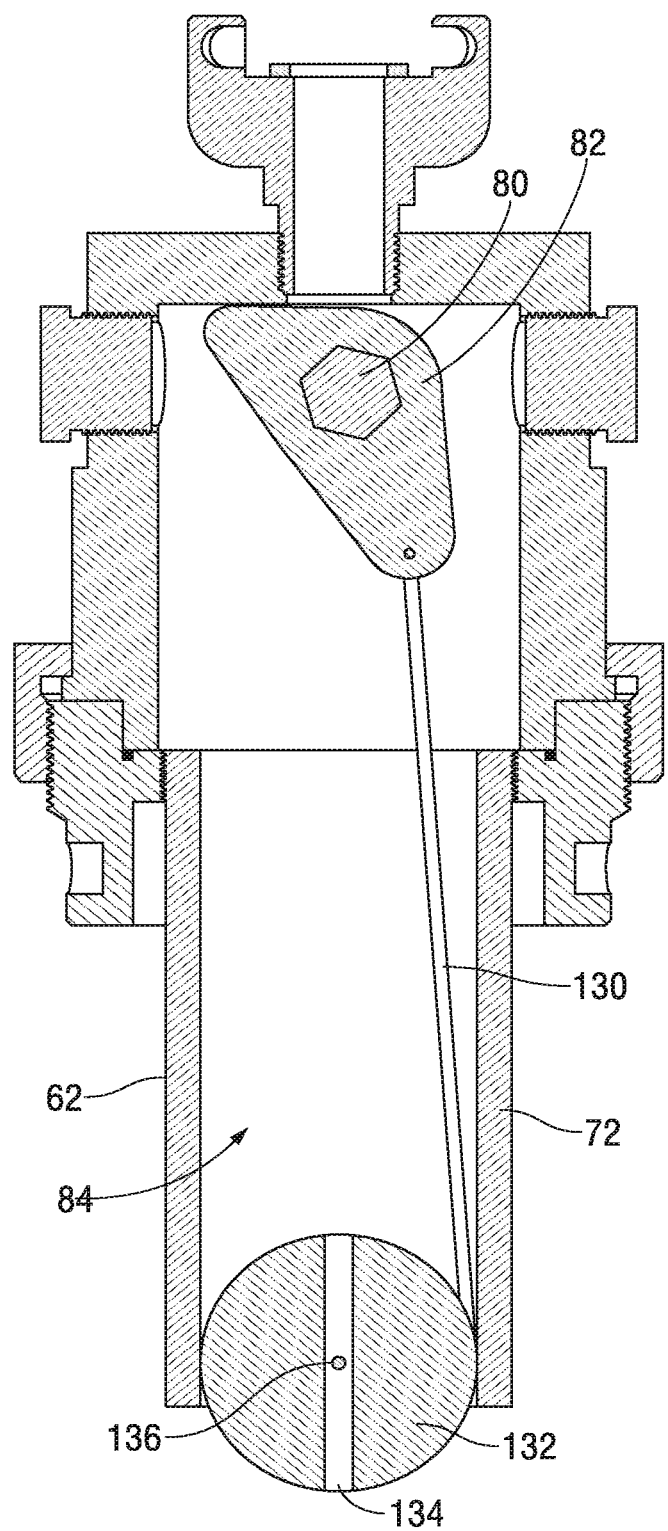
FIG. 8 illustrates a cross-sectional view of an embodiment of the plug-free release valve of FIG. 2.

FIG. 7 illustrates a cross-sectional view of an embodiment of the plug-free release valve 34 of FIG. 2. The release valve 34 includes an extension rod 130 that connects the cam 82 to the bottom of the sleeve weldment 72. The extension rod 130 enables the operator to connect a motion at the top of the release valve 34 and translate the motion to the bottom of the release valve 34, where the sleeve weldment 72 is in thermal balance with the interior volume 78 of the tank vessel 10. The release valve 34 also includes, in the illustrated embodiment, a ball valve 132 that rotates along an axis 136 so that a channel 134 may switch from a closed position to an open position. The open position is illustrated in the embodiment of FIG. 8. The ball valve 132 may be opened by rotating the cam 82 with the cam shaft 80, which may be turned at the release valve 34, or remotely as described above. The channel 134 may be variably sized based on a desired pressure release speed. For example, the channel 134 may include a small opening (e.g., 10 percent of the cross-sectional area of the ball valve 132) or may include a large opening (e.g., 40 percent or more of the cross-sectional area of the ball valve 132) to more quickly evacuate or intake pressure change.

Figure 9:
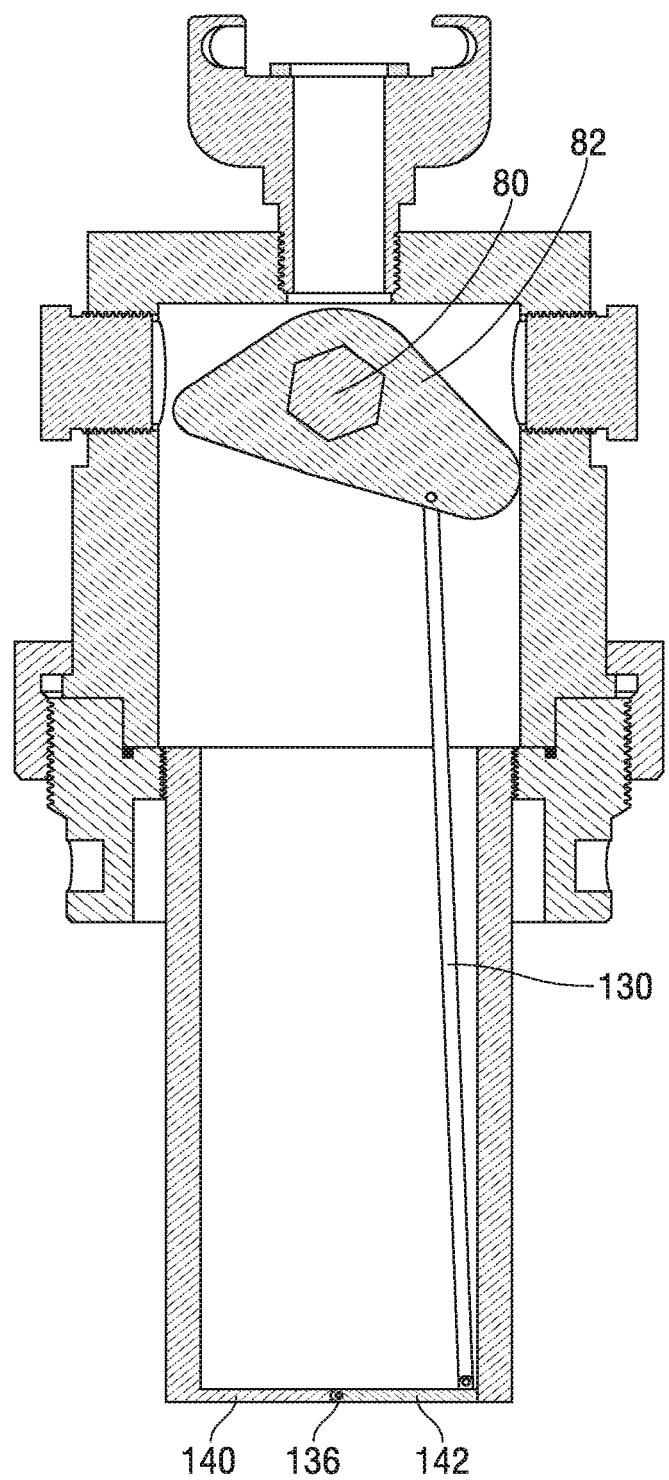
FIG. 9 illustrates a cross-sectional view of an embodiment of the plug-free release valve of FIG. 2.
Figure 10:
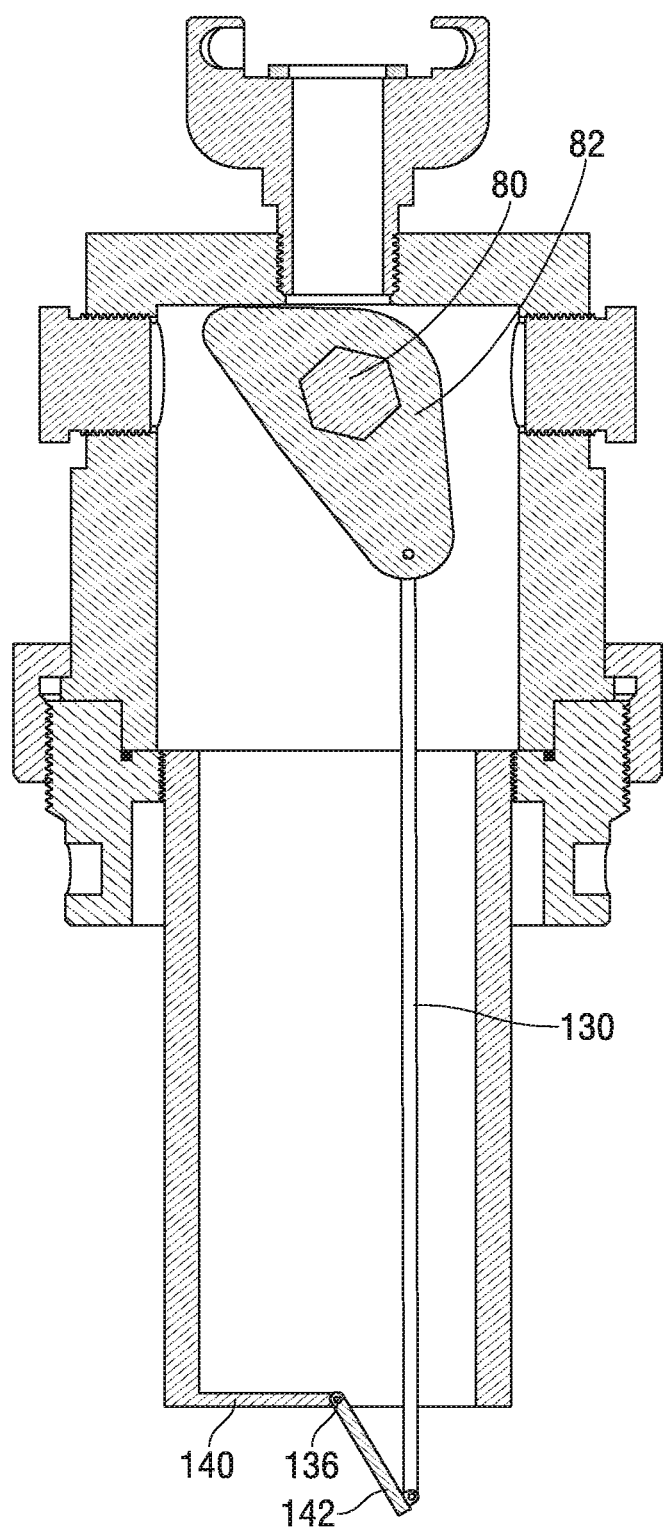
FIG. 10 illustrates a cross-sectional view of an embodiment of the plug-free release valve of FIG. 2.

FIG. 9 illustrates a cross-sectional view of an embodiment of the plug-free release valve 34 of FIG. 2. The release valve 34 of FIG. 9 also includes the connecting rod 130 that extends movement from outside the release valve 34 to the distal end of the sleeve weldment 72. The release valve 34 in the illustrated embodiment includes a cover plate 140 that may rotate around the axis 136 to open the distal end 74 of the sleeve weldment 72. The cover plate 140 thus opens into the sleeve weldment 72 on the left side (as seen in FIG. 9) and opens into the interior volume 78 on the right side (as seen in FIG. 9). Alternatively, as shown in FIG. 10, the release valve 34 may include a cover plate 140 that has only a portion 142 that rotates around the axis 136. The portion 142 may be half of the cover plate 140, or more, or less. Additionally or alternatively, the cover plate 140 may have both halves rotate into the interior volume 78.

The foregoing disclosure and the showings made of the drawings are merely illustrative of the principles of this invention and are not to be interpreted in a limiting sense.

The invention claimed is:

1. A valve for use in a tank vessel, comprising:
   a valve housing configured to fit into the tank vessel;
   a sleeve weldment coupled to the valve housing, wherein the sleeve weldment comprises a first end configured to protrude into an interior volume of the tank vessel;
   a valve plunger configured to be installed within the sleeve weldment, wherein the valve plunger comprises a valve bottom at the first end of the sleeve weldment and configured to seal, at a first position of the valve bottom, an opening at the first end between the valve bottom and an interior opening of the sleeve weldment;
   a cam configured to force the valve plunger into the interior of the tank vessel to break the seal between the valve bottom and the interior opening of the sleeve weldment at a second position of the valve bottom; and
   a pipe plug attachable to the valve housing at a position adjacent the cam,
   wherein a majority of the valve bottom is located within the sleeve weldment at the first position of valve bottom.

2. The valve of claim 1, further comprising a spring configured to bias the valve plunger away from the interior of the tank vessel to maintain the seal.

3. The valve of claim 1, wherein the sleeve weldment comprises a top valve guide and a bottom valve guide configured to centralize the valve plunger within the sleeve weldment.

4. The valve of claim 1, further comprising a hose attachment coupled to the valve housing, wherein the hose attachment is configured to connect to a pressurizing hose, a venting hose, or combinations thereof.

5. The valve of claim 4, wherein the pressurizing hose is configured to pressurize a cavity within the valve housing to a valve pressure that is greater than a tank pressure within the interior volume of the tank vessel.

6. The valve of claim 1, comprising a handle coupled to an exterior of the valve housing and configured to rotate the cam in response to a force from an operator.

7. The valve of claim 6, comprising a cable connected to the handle and a remote trigger, wherein the operator may manipulate the remote trigger to pull the cable and rotate the handle on the valve housing while standing on a ground location near the tank vessel.

8. The valve of claim 1, wherein the valve housing is configured to fit within a vent opening comprising a 3.75 inch (8.89 cm) portal fitted with national pipe thread (NPT).

9. The valve of claim 1, wherein the first end of the sleeve weldment is at a distal end of the valve housing, and the valve further comprises a hose attachment detachably connected to a proximal end of the valve housing, the proximal end being opposite to the distal end of the valve housing.

* * * * *